(12) United States Patent
Nolan

(10) Patent No.: US 7,753,314 B2
(45) Date of Patent: *Jul. 13, 2010

(54) SYSTEMS AND METHODS FOR AERIAL DISPERSION OF MATERIALS

(75) Inventor: Brooks R. Nolan, Heath, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 272 days.

This patent is subject to a terminal disclaimer.

(21) Appl. No.: 11/973,263

(22) Filed: Oct. 5, 2007

(65) Prior Publication Data

US 2008/0035648 A1 Feb. 14, 2008

Related U.S. Application Data

(63) Continuation of application No. 10/676,842, filed on Oct. 1, 2003, now Pat. No. 7,284,727.

(51) Int. Cl.
*B64D 1/18* (2006.01)
(52) U.S. Cl. .................................. 244/136; 239/171
(58) Field of Classification Search ................ 244/136, 244/137.1, 137.3, 129.2; 239/171
See application file for complete search history.

(56) References Cited

U.S. PATENT DOCUMENTS

| 2,858,774 A | 11/1958 | Batten |
| 3,603,506 A | 9/1971 | Hubbs |
| 3,692,203 A | 9/1972 | Byrd et al. |
| 3,698,480 A | 10/1972 | Newton |
| 3,861,541 A | 1/1975 | Taft et al. |
| 3,897,829 A | 8/1975 | Eason |
| 3,901,467 A | 8/1975 | Hawkshaw |

(Continued)

FOREIGN PATENT DOCUMENTS

WO          WO02/24529 A1        3/2002

OTHER PUBLICATIONS

"Federal Aerial Firefighting: Assessing Safety and Effectiveness," Blue Ribbon Panel Report to the Chief, USDA Forest Service and Director, USDI Bureau of Land Management, Dec. 2002, 58 pgs.

(Continued)

*Primary Examiner*—Rob Swiatek
(74) *Attorney, Agent, or Firm*—O'Keefe, Egan, Peterman & Enders LLP

(57) ABSTRACT

Aerial dispersion systems that may be employed to allow rapid and temporary conversion of aircraft for aerial dispersion purposes, such as aerial fire-fighting. The aerial dispersion systems may be implemented using modular components that may be configured for compatibility with conventional cargo loading and unloading systems of modern aircraft, including side-loading cargo systems of wide body passenger and cargo aircraft having high lift capacities. The aerial dispersion systems may be rapidly installed in a large fleet of high capacity aircraft in response to a wildfire or other rapidly-developing emergency such as an oil spill, chemical or biological contamination incident, building or refinery fire, etc. After use, the aircraft of the fleet may be rapidly de-modified and returned to original condition. The aerial dispersion systems may be operated with a fleet of aircraft in a coordinated manner, for example, as part of an aerial fire-fighting formation having multiple aircraft sharing information and/or common control.

35 Claims, 6 Drawing Sheets

U.S. PATENT DOCUMENTS

| | | | |
|---|---|---|---|
| 4,172,499 | A | 10/1979 | Richardson et al. |
| 4,195,693 | A | 4/1980 | Busch et al. |
| 4,437,630 | A | 3/1984 | Jefferies |
| 4,858,778 | A | 8/1989 | Patrick |
| 4,860,973 | A | 8/1989 | Fenner |
| 4,936,389 | A | 6/1990 | MacDonald et al. |
| 5,090,639 | A | 2/1992 | Miller et al. |
| 5,549,259 | A | 8/1996 | Herlik |
| 5,630,694 | A | 5/1997 | Ihara |
| 5,794,889 | A | 8/1998 | Bailey |
| 6,367,615 | B1 | 4/2002 | Helmner |
| 6,578,796 | B2 | 6/2003 | Maeda |
| 6,581,878 | B1 | 6/2003 | Bennett |
| 6,622,966 | B1 | 9/2003 | McConnell |
| 6,705,817 | B2 | 3/2004 | Wittenstein et al. |
| 7,413,145 | B2 * | 8/2008 | Hale et al. .......... 244/136 |
| 2002/0020782 | A1 | 2/2002 | Huber |
| 2003/0139135 | A1 | 7/2003 | Rossi |
| 2005/0017131 | A1 | 1/2005 | Hale et al. |
| 2005/0072880 | A1 | 4/2005 | Nolan |

OTHER PUBLICATIONS

AVWeb Services, www.aeroshell.com, Jan. 13, 2003, 4 pgs.
"FAA Orders Inspections of Boeing 727 Fuel Tank Conduits," Journal of Aerospace and Defense Industry News, May 25, 1999, 8 pgs.
Auxiliary Fuel Tanks, www.patsinc.com/prodnserv/auxiliary.tanks.html, printed from Internet Sep. 4, 2003, 1 pg.
Engineering & Manufacturing, www.patsinc.com/prodnserv/eng.manufacturing.html, printed from Internet Sep. 4, 2003, 1 pg.
Pats, Inc., Auxiliary Fuel Tanks and Power Units, www.decraneaircraft.com/pats_text.html, printed from Internet Sep. 4, 2003; 1 pg.
SFAR 88, Pats Auxiliary Fuel System Compliance, www.sfar88.com/pats/index.htm, printed from Internet Sep. 4, 2003, 1 pg.
DeCrane Aircraft Systems Integration Group, Pats, Inc., printed from Internet Sep. 4, 2003, 4 pgs.
Untitled Document, www.decraneaircraft.com/middle_sys_int.html, The Text of Which Was Available on the Internet Prior to the Oct. 1, 2003 filing Date of the Copending U.S. Appl. No. 10/676,842.
Complete Solutions in Aircraft Modification, Hollingsead International, Inc., www.decraneaircraft.com/hollingsead._text.html, printed from Internet Jan. 14, 2004, 1 pg.
Seats, Divans, Tables, Beds, Precision Hinges and Mounting Blocks, Decrane Aircraft Seating Company Inc., www.decraneaircraft.com/sc_text.html, printed from Internet Jan. 14, 2004, 1 pg.
Hale, U.S. Appl. No. 60/571,819, entitled "Aerial Delivery System", filed May 17, 2004, 13 pgs.
Hale, U.S. Appl. No. 60/477,829, entitled "Aerial Delivery System", filed Jun. 11, 2003, 11 pgs.
Search Report, PCT/US04/31881, 4 pgs.
Boeing, "Main Deck Side Cargo Door", 747-400 and Longer Range 747-400 Freighters, Printed From Internet Apr. 18, 2007, 1 pg.
Bax Global Enhances Fleet, Adds Wide Body Aircraft to Serve Southern California Market, Printed From Internet Apr. 18, 2007, 1 pg.
Transall C-160, Wikipedia, Printed From Internet Apr. 18, 2007, 3 pg.

* cited by examiner

```
                   ┌─────────────────────────────────────┐
            616 ──┤         Host Aircraft Systems        │
                   └─────────────────────────────────────┘
                      ↕              ↕              ↕
    602 ┐         604 ┐         606 ┐
   ┌──────────┐   ┌──────────┐   ┌──────────────┐
   │Navigation│→  │ Control  │↔  │Communications│
   │Subsystem │   │Subsystem │   │  Subsystem   │
   └──────────┘   └──────────┘   └──────────────┘
```

FIG. 6

(Block diagram 600: Host Aircraft Systems 616 connects to Navigation Subsystem 602, Control Subsystem 604, and Communications Subsystem 606. Control Subsystem 604 connects to Sensor Subsystem 608, Material Containment Subsystem 610, which connects to Material Dispersal Subsystem 612. Ground Handling and Support Subsystem 614 is also shown.)

SYSTEMS AND METHODS FOR AERIAL DISPERSION OF MATERIALS

This patent application is a continuation of U.S. patent application Ser. No. 10/676,842, entitled "Systems And Methods For Aerial Dispersion Of Materials", filed on Oct. 1, 2003, now U.S. Pat. No. 7,284,727 which is incorporated herein by reference.

BACKGROUND OF THE INVENTION

1. Field of the Invention

This invention relates generally to aircraft systems, and more particularly to aircraft systems that may be used for aerial dispersion of materials.

2. Description of the Related Art

Aircraft are commonly employed for the aerial dispersion of liquid and/or solid materials such as fire retardant or fire extinguishing materials, oil dispersant materials, bio-remediation materials, fertilizer materials, herbicide materials, defoliant materials, pesticide materials, etc. For example, specially-equipped aircraft are used to carry and deliver fire retardant materials to the area of a forest or brush fire. Such fire-fighting aircraft are typically converted World War II era bombers or propeller-driven passenger or cargo planes that have a carrying capacity limited to 3000 gallons or less of liquid fire retardant material. These vintage aircraft typically deliver their load of fire retardant material by flying to the area of the fire and then making a low altitude bombing run over the fire that often requires steep dives and climbs to accurately deliver the fire retardant payload to a targeted fire hot spot. The nature of these low altitude bombing runs often result in g-force stresses that exceed the structural rating of these aircraft, weakening the structure of the aircraft and in some cases causing in-flight structural failures leading to loss of the aircraft and crew. A limited supply of vintage aircraft and the grounding of particular types of aircraft due to structural weaknesses has resulted in a shortage of fire-fighting aircraft.

Many vintage aircraft are converted for aerial dispersion of materials by the permanent installation of material dispersion equipment. Modular aerial spraying systems have also been developed for use in conversion of C-130 cargo aircraft for aerial spraying purposes. Known as the Modular Airborne Fire Fighting System ("MAFFS"), these systems employ portable pressurized tanks which are loaded onto a C-130 aircraft through the lowered rear cargo ramp of the aircraft. The lifting capacity of the C-130 aircraft limits the amount of water or water-based retardant which may be carried by the MAFFS aircraft to about 3000 gallons. Most MAFFS are "single shot" systems that discharge a full 3000 gallon load at one time, although there exist two load MAFFS units that may split a 3000 gallon load into two separate discharges. Because of their drop pattern, MAFFS are not typically used for support in residential areas or for initial attack on a fire, which usually require multiple drops from a single air tanker. In addition to limitations in MAFFS capacity and drop pattern, certain C-130 aircraft that are employed for MAFFS purposes have been recently grounded due to excessive stresses imparted on these aircraft when using them for aerial fire-fighting.

Specialized modern aircraft have also been developed for aerial fire-fighting purposes. In this regard, the Canadair CL-415 is capable of in-flight re-filling from large bodies of water, such as lakes. However, the CL-415 is very expensive relative to vintage aircraft, has a limited carrying capacity of approximately 1621 gallons of liquid fire retardant material, and the cost of obtaining and maintaining a state-of-the-art modern fleet of such aircraft would be prohibitive. Furthermore, such a fleet of fire-fighting capable aircraft is not needed all the time. Thus, the relatively small carrying capacity, specialized nature, and high cost of such aircraft prohibits large-scale deployment in an aerial fire-fighting fleet.

Further information on practices and condition of the aerial firefighting fleet in the United States may be found in *Federal Aerial Firefighting: Assessing Safety and Effectiveness*, Blue Ribbon Panel Report to the Chief, USDA Forest Service and Director, USDI Bureau of Land Management, December 2002.

SUMMARY OF THE INVENTION

Disclosed are methods and systems that may be implemented to allow rapid and temporary conversion of aircraft for aerial dispersion purposes, such as aerial fire-fighting. The aerial dispersion equipment of the disclosed systems and methods may be implemented using modular components that may be configured for compatibility with conventional cargo loading and unloading systems of modern aircraft, including side-loading cargo systems of wide body passenger and cargo aircraft having high lift capacities. In one embodiment, wide body commercial aircraft may be quickly and temporarily modified for aerial dispersion purposes, allowing a large fleet of high capacity aerial dispersion aircraft to be quickly assembled, for example, in response to a wildfire or other rapidly-developing emergency such as an oil spill, chemical or biological contamination incident, building or refinery fire, etc. After use, the aircraft may be rapidly de-modified and returned to original condition, e.g., as commercial passenger or cargo plane, or as military transport or bomber. In another embodiment, such a fleet of aerial dispersion aircraft may be configured to operate in a coordinated manner, for example, as part of an aerial firefighting formation sharing common control such as ground control or lead aircraft that directs flight path and/or release of materials from individual aircraft in the formation. Military heavy lift aircraft (e.g., including transport and bomber aircraft) may be similarly converted and employed, either in combination with or as an alternative to commercial aircraft.

The disclosed systems and methods may be configured to utilize relatively inexpensive modular equipment that may be quickly loaded onto and unloaded from an aircraft using the conventional cargo systems of the aircraft, advantageously allowing modification and de-modification of side-loading aircraft that do not have a wide rear cargo ramp such as possessed by C-130 aircraft. For example, modular and connectable units in the shape of conventional cargo pods may be rapidly loaded and unloaded through side cargo doors into the cargo hold of high lift capacity wide body commercial aircraft (e.g., such as 747, 767, 777 or MD-11 aircraft) or high lift capacity wide body military/cargo aircraft (e.g., such as C-5, C-141, etc.) in a manner consistent with normal cargo loading operations to provide a removable and re-useable aerial dispersion system having a capacity much larger than the capacity of existing aerial dispersion systems. In those embodiments where the modular units are configured in the shape of conventional cargo pods, they may be employed with a wide variety of aircraft types that employ the same type of cargo pods regardless of the capacity of a given aircraft. Furthermore, the modular nature of the cargo pods allows a given aircraft to be provided with an aerial dispersion system of desired or customized capacity and/or capability to fit a given application, i.e., by loading a desired number and type of modular units required to provide the desired capacity and capabilities of the system.

The high capacity aerial dispersion systems that may be provided using the disclosed systems and methods make possible aerial dispersion techniques that do not require low altitude or high angle dives or climbs to apply aerial dispersants to targets, such as fire hot spots. In this regard, high lift capacity wide-body aircraft may be provided with aerial dispersion systems having a capacity of aerial dispersant material that is many times the capacity of existing aerial dispersion systems. Using these high capacity aerial dispersion systems allows high volumes of aerial dispersant to be effectively applied to a target drop point location from a higher altitude without requiring steep diving or climbing maneuvers that may result in unacceptable g-force stresses. Furthermore, since the disclosed aerial dispersion systems may be rapidly installed on conventional commercial and/or military aircraft, it is possible to provide a large number of high capacity aerial dispersion aircraft that may be deployed together to provide a very large volume of aerial dispersant simultaneously and/or sequentially onto a given target or targets, e.g., to rapidly and effectively suppress a wildfire. Following the aerial dispersion mission, the disclosed aerial dispersion systems my be rapidly de-installed or removed from the aircraft so that the commercial or military aircraft may be quickly returned to normal configuration for resumption of conventional flight operations.

In one respect, disclosed herein is an aerial dispersant holding tank configured as a pseudo cargo container and including a first flow opening for dispersant material. The first flow opening may be configured for flow of dispersant material during aerial dispersement of the dispersant material. The first flow opening of the aerial dispersant holding tank may be further configured to be coupled to at least one other aerial dispersant holding tank to provide a dispersant material flow path from the aerial dispersant holding tank to the second aerial dispersant holding tank.

In another respect, disclosed herein is an aerial dispersion system configured for use with a host aircraft, including: one or more aerial dispersant holding tanks configured as pseudo cargo containers; a dispersal regulator configured to be coupled to the one or more aerial dispersant holding tanks; and an airborne dispersal device configured to be coupled to the dispersal regulator.

In another respect, disclosed herein is an aircraft-based material dispersion system, including: a host aircraft; one or more aerial dispersant holding tanks disposed within the host aircraft, the aerial dispersant holding tanks being configured as pseudo cargo containers; a dispersal regulator disposed on the host aircraft and coupled to the one or more aerial dispersant holding tanks; and an airborne dispersal device disposed on the host aircraft and coupled to the dispersal regulator.

In another respect, disclosed herein is a method of converting at least one host aircraft for aerial dispersion of material, including: removably disposing one or more aerial dispersant holding tanks within at least one host aircraft, the aerial dispersant holding tanks being configured as pseudo cargo containers; removably disposing a dispersal regulator on the host aircraft; the dispersal regulator being coupled to the one or more aerial dispersant holding tanks; and removably disposing an airborne dispersal device on the host aircraft, the airborne dispersal device being coupled to the dispersal regulator.

In another respect, disclosed herein is an aerial dispersant holding tank for use within a passenger compartment of a host aircraft. The aerial dispersant holding tank may be configured to be removably installed within the passenger compartment through a passenger door of the aircraft.

BRIEF DESCRIPTION OF THE DRAWINGS

FIG. 6 is a simplified block diagram of an aerial dispersion system according to one embodiment of the disclosed systems and methods.

DESCRIPTION OF ILLUSTRATIVE EMBODIMENTS

Figure 1:
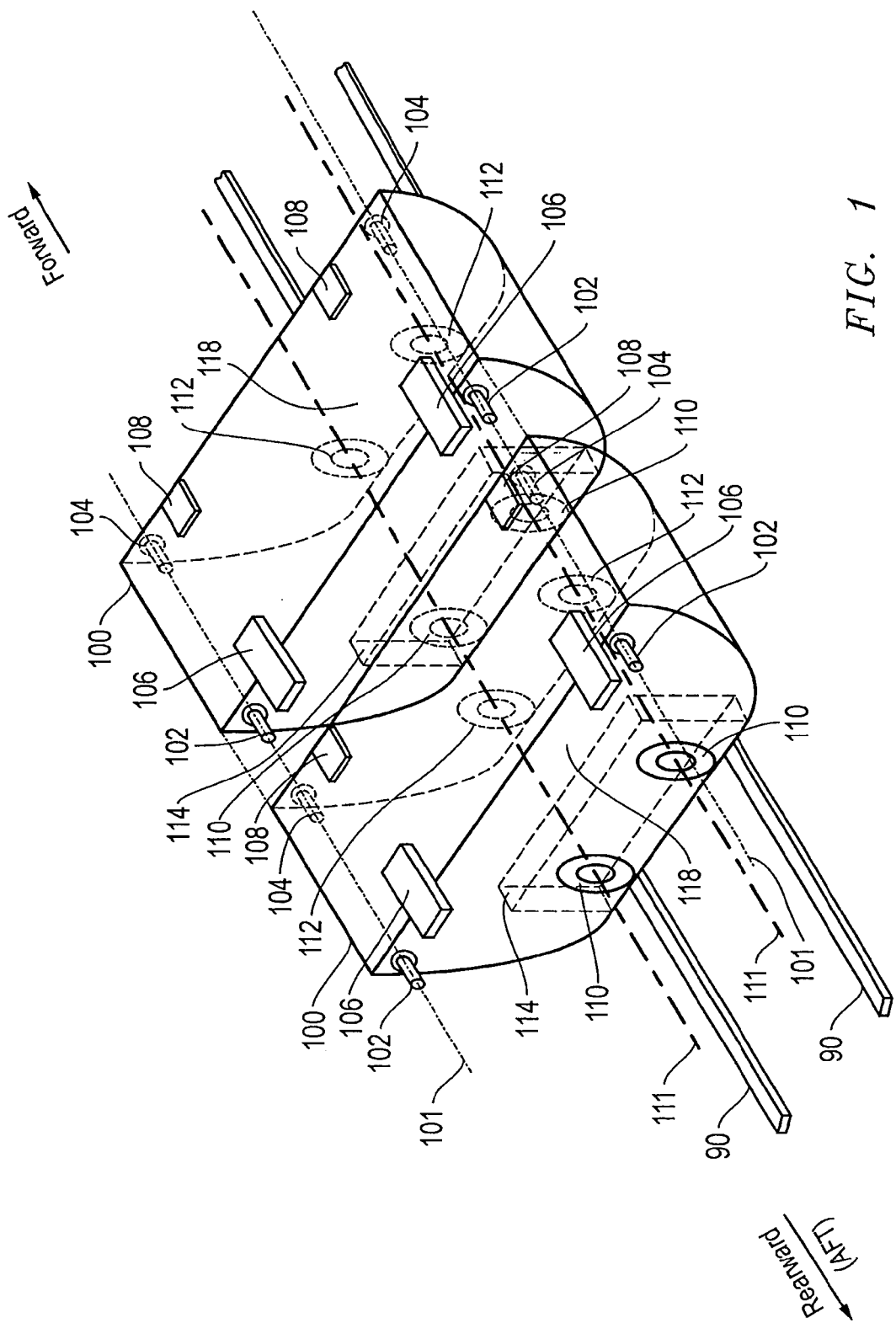
FIG. 1 is a simplified perspective view of modular pseudo cargo containers according to one embodiment of the disclosed systems and methods.

FIG. 1 illustrates aerial dispersant holding tanks 100 that may be employed in one embodiment to temporarily modify an aircraft, such commercial or military wide-body aircraft, for the aerial dispersement of materials. FIG. 1 shows two aerial dispersant holding tanks 100 positioned in a front end-to-rear end relationship as they may be deployed within the baggage or cargo hold of an aircraft. However, it will be understood that any number of such tanks 100 may be flexibly employed in a given aircraft as may be desirable or required to fit the needs of a given application. In this regard, a greater number of tanks 100 may be employed in aircraft having longer cargo holds and higher lift capacities, and/or in those situations where it is desirable to provide a relatively large volume for carrying dispersant material. A smaller number of tanks 100 may be employed in smaller aircraft and/or in situations where it is desirable to provide a relatively smaller volume for carrying dispersant material. For example, in the latter situation it may be desirable to reserve cargo room for carrying personnel or other types of cargo related to the aerial dispersant task at hand.

As illustrated in FIG. 1, each of aerial dispersant holding tanks 100 are configured as pseudo-cargo containers, i.e., having outer dimensions that correspond to dimensions of conventional cargo containers that are employed in the side-loading cargo systems of wide body aircraft, such as 747, 767, 777, MD-11, C-5 and C-141 aircraft. As shown, such cargo containers may have sides with a shape complementary to the interior dimensions and shape of the aircraft baggage or cargo hold. By configuring tanks 100 as pseudo-cargo containers enables tanks 100 to be easily loaded and unloaded from the baggage or cargo holds of an aircraft using the same equipment and methods employed for loading and unloading conventional cargo containers from the aircraft. In this regard, the cargo systems of such aircraft are designed to load the cargo containers from the side of the aircraft through one or more cargo doors into the baggage or cargo hold of the aircraft, where the containers are received upon suitably configured surface 90 (e.g., track, rails, rollers, etc.) upon which the cargo containers may be slidably or rollably transported forward or rearward in a direction parallel to the longitudinal axis of the aircraft fuselage and stacked in end to end manner. Once loaded, the cargo containers may be secured in this end-to-end relationship for the duration of the flight, or until otherwise necessary to remove the cargo containers from the aircraft. Unloading of the cargo containers from the aircraft may proceed in a fashion that is substantially reverse to the manner employed in the container loading process.

Although FIG. 1 illustrates one exemplary embodiment of aerial dispersant tanks that are dimensionally configured for use as pseudo cargo containers with one type of conventional cargo container system and aircraft cargo hold configuration, it will be understood that aerial dispersant holding tanks may be alternatively configured in other embodiments to have other suitable dimensions and/or shapes as may be required for use as pseudo cargo containers with other types of cargo handling systems and/or aircraft cargo hold configurations. Furthermore, it will be understood that the exemplary "forward" and "rearward" notations used in FIG. 1 are employed only to facilitate understanding of how tanks 100 of the disclosed systems and methods may interrelate within an aircraft in one exemplary embodiment. It is possible in other embodiments that tanks 100 may be oriented in the opposite direction within an aircraft, and/or that one or more of the illustrated feature of tanks 100 may be alternatively and operationally configured on the opposite end or other surfaces of such tanks in a manner that allows the tanks to be suitably employed in the disclosed aerial dispersant systems in a manner as described elsewhere herein.

Still referring to FIG. 1, aerial dispersant holding tanks 100 may be configured with a substantially hollow interior 118 for holding liquid and/or solid aerial dispersant material, e.g., fire retardant/extinguishing material, oil dispersant material, bio-remediation material, fertilizer material, herbicide material, defoliant material, pesticide material, etc. In this regard, the types of materials and wall thicknesses employed in the construction of tanks 100 may be selected to fit the characteristics of a given aerial dispersion application (e.g., constructed of chemical resistant materials, constructed with increased wall thickness to handle pressurization of the tank, constructed of lightweight materials such as aluminum or plastic to reduce system weight, etc.). Examples of materials that may be employed as aerial dispersant materials for fire fighting purposes include water or chemicals (e.g., powders, liquid concentrates, etc.) that are mixed with water immediately prior to use. Examples of types of such chemicals include, but are not limited to, surfactants and fire retardant, fire suppressant or fire extinguishing chemicals. Specific examples of such chemicals include, but are not limited to, phosphate and ammonium-based compounds, which may also be mixed with dye markers for visibility.

Although not shown, the interior 118 of tanks 100 may be baffled as necessary to prevent side-to-side and/or forward-to-rearward sloshing or settling of the tank contents during take-off, landing and flight operations. Further, the interior of tanks 100 may be optionally configured with a cylindrical, spherical or other pressure-containing shape in those embodiments where tanks 100 are to be pressurized for enhancing material flow during dispersement. In one exemplary embodiment, tanks 100 may be of a collapsible configuration (e.g., constructed of metal or composite material) to reduce storage area and to facilitate ease of transport from location to location when not in use.

In the illustrated embodiment, each of aerial dispersant holding tanks 100 includes two rearward-facing dispersant material flow openings 110 and two complimentary forward-facing dispersant material flow openings 112 that are dimensionally configured on the same centerlines 111 so as to sealably mate when adjacent tanks are rolled or otherwise positioned in end-to-end relationship within the cargo hold of an aircraft. Once so mated, flow openings 110 and 112 are configured to provide communication between adjacent tanks so that a flow path is provided that allows dispersant material to flow from one tank to another adjacent tank. Sealable mating between a given flow opening 110 and corresponding flow opening 112 may be provided using any sealing mechanism suitable for proving a leak-free connection between the interiors 118 of adjacent tanks. In this regard, it may be desirable that the flow openings automatically seal when adjacent tanks are assembled in end-to-end relationship (e.g., using mating polished surfaces, O-ring seals, etc.), although it is also possible that threaded or other manipulatable or connections may alternatively be employed. It will be understood that an aerial dispersant holding tank may be configured with flow openings on only one end of the tank (e.g., the rear end of the tank) so that it may be positioned on the terminal end of a material containment system formed from an interconnected group of material holding tanks. Alternatively, a terminal container may be provided by covering flow openings on one end of the tank with blind flanges, or by closing off flow openings one end of the tank using externally or internally provided valves.

It will be understood that the illustrated flow opening configuration of FIG. 1 is exemplary only, and that any number and/or configuration of flow openings may be employed that are suitable for providing sufficient tank-to-tank flow characteristics (e.g., fluid dynamics) during material loading and unloading operations (e.g., during ground loading of the material and during aerial dispersement of the material) to meet desired or required flow capabilities. For example, it is usually desirable that sufficient flow capability exist between adjacent tanks to meet desired aerial dispersion rates under anticipated material dispersion conditions (e.g., baggage or cargo hold attitude with respect to the horizontal, pressurized or unpressurized condition of aerial dispersant holding tanks, input pressure requirements of pump/s or other material transport equipment employed within the aerial dispersion system, liquid viscosity or slurried condition of material held within the tanks, solid/powered condition of material held within the tanks, etc.). In this regard, a single flow opening or more than two flow openings may be provided on one end surface of a tank, non-cylindrical shaped flow openings may be employed, and/or flow openings may be positioned in different locations on the tank ends than is illustrated in FIG. 1.

Optional flow control and/or metering equipment may also be provided in conjunction with one or more aerial dispersant holding tanks of an aerial dispersion system to provide positive control and/or metering of materials such as liquids that may be contained within the tanks. For example, each aerial dispersant holding tank 100 of FIG. 1 is shown provided with an internal flow control and monitoring subsystem 114 that may be configured to control and/or meter flow of dispersant material between adjacent tanks 100 through flow openings 110 and 112. For example, a flow control and monitoring subsystem 114 may include automated valves for regulating material flow through flow openings 110 and 112 between tanks 100, and/or flow metering devices that measure flow of material through flow openings 110 and 112 between tanks 100 and provide a flow rate signal to a system operator and/or control subsystem. In this regard, flow control between tanks may be implemented to ensure sufficient flow of material to achieve adequate aerial dispersement rates while at the same time controlling distribution of materials within the tanks of the aerial dispersion system.

Flow control and monitoring subsystem 114 may also be configured to counteract undesirable shifts in aircraft center of gravity when tanks 100 are loaded or partially loaded with dispersant material, e.g., by transferring material between tanks 100 as needed. This may be accomplished in one embodiment using localized sensors and valves to provide local control, and/or in response to centralized control signals from a system operator and/or control subsystem. Flow control and monitoring subsystem 114 may also include emergency shut down and/or other fail safe flow control equipment (ESD equipment) to control or shut-off material flow between tanks 100 during ground or airborne operations, for example, during inadvertent separation of two adjacent tanks 100, upon development of a leak in the material containment or material dispersal subsystems of the aerial dispersion system, etc. Such ESD equipment may be automatically actuated locally or by a central control subsystem, and/or manually actuated by a system operator. Although illustrated as equipment internal to tanks 100, it will be understood that a portion or all components of a flow control and monitoring subsystem 114 may be externally mounted to a tank 100.

In one exemplary embodiment, flow control and monitoring equipment such as flow control and monitoring subsystems 114 may optionally include material transport and/or tank pressurization devices that may be present to facilitate transfer of liquid, slurried or solid material/s between adjacent tanks during ground loading of dispersant materials into the aerial dispersant holding tanks and/or during ground or airborne unloading of the aerial dispersant tanks. Examples of such material transport and/or pressurization devices include, but are not limited to, pumps, augers, blowers, compressors, etc. Such material transport and/or pressurization devices may be controlled by a system operator and/or control subsystem or may be controlled locally by sensors mounted within the same tank as the material transport and/or pressurization device/s.

Securing features may be optionally employed to selectably secure adjacent tanks to each other in end-to-end relationship within the baggage or cargo hold of an aircraft. For example, in the illustrated embodiment of FIG. 1, tanks 100 are provided with securing features in the form of front latches 106 and complementary rear latches 108, which may be configured to releasably secure respective front and rear ends of adjacent tanks 100 to each other via mechanical, electromechanical or other suitable latching mechanism and in a position such that mating flow openings (e.g., flow openings 110 and 112) of the adjacent tanks 100 are disposed in sealably mated condition. Securing features of adjacent tanks may be configured to mate and secure to each other in any fashion suitable for securing the adjacent tanks to each other. For example, securing features of adjacent tanks may be configured to automatically mate and lock together upon contact during tank loading operations. Likewise, securing features of adjacent tanks may be configured to release and separate from each other in any suitable manner, for example during tank unloading operations, e.g., manual release, automatic release via electromechanical means, etc.

Alignment features may also be optionally provided. For example, as illustrated in FIG. 1, each of aerial dispersant holding tanks 100 may be provided with first alignment features (e.g., rear alignment pins 102 on rear end of a tank 100) that are configured to be received in corresponding second alignment features dimensionally configured on the same centerlines 101 (e.g., corresponding front alignment receptacles 104 on the front end of an adjacent tank) to facilitate proper end-to-end alignment of the tanks 100 once they are positioned within the baggage or cargo hold of an aircraft.

In one embodiment, it is possible that one or more alignment features may also be provided with electrical connectors for communicating sensor and control information between the individual tanks of a system and a system operator and/or control subsystem. For example, electrical conductors and connectors (not shown) may be provided that are operable to interconnect tank sensors (e.g., tank contents level sensors, tank temperature sensors, tank pressure sensors, etc.) and/or flow control and metering equipment of adjacent individual tanks when the alignment features are engaged. Alternatively, such systems may be interconnected in any other suitable manner, e.g., by separate and/or external wiring and connectors, by wireless radio or optical signals, etc. It is also possible that one or more alignment features may also be provided with conduit and conduit connectors (not shown) for transporting materials (e.g., such as pressurized gas and/or chemicals) between a source of such materials and the individual tanks of the system. Alternatively, separate and/or external conduits and conduit connectors may be provided for transporting materials in a similar manner. In other embodiments, it is possible that alignment, tank securing and/or flow opening features may be combined into a single type of feature, e.g., combined alignment and securing pin, combined alignment and securing latch, combined flow opening and latch, etc.

Figure 2:
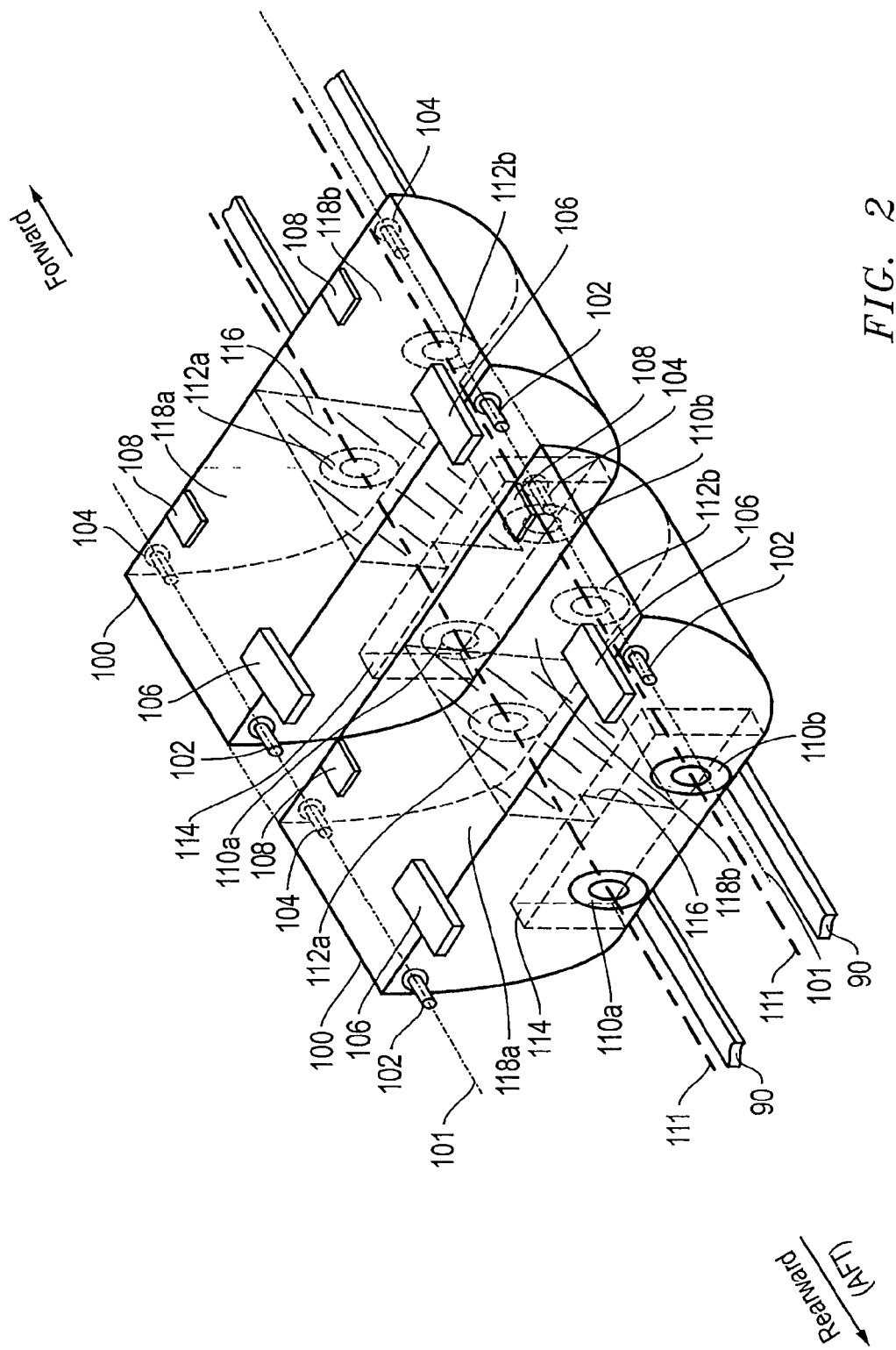
FIG. 2 is a simplified perspective view of modular pseudo cargo containers according to another embodiment of the disclosed systems and methods.

In an alternate embodiment, aerial dispersant holding tanks may be configured with a segmented interior for segregating dispersant materials held within the interior of the tanks. This may be desirable, for example, to provide the holding capacity for two or more different materials (e.g., that may be mixed or otherwise combined prior to aerial dispersement) and/or to provide separate volumes of dispersant materials, e.g., to be dispersed at different times (e.g., as separate steps of an aerial dispersement treatment or for different types of aerial dispersement treatments). FIG. 2 illustrates one example of such an embodiment in which aerial dispersant holding tanks 100 may be configured with tank dividers 116 that separate the substantially hollow interior of each tank 100 into two separate holding compartments 118a and 118b. In such an embodiment, flow openings 110a and 112a may be provided for interconnecting compartments 118a, and flow openings 110b and 112b may be provided for interconnecting compartments 118b. Flow control and monitoring subsystems 114 may be configured in such an embodiment to control and/or monitor material flow through flow openings 110a and 112a in a manner separate and independently from flow openings 110b and 112b. Although two separate holding compartments are illustrated in FIG. 2, it will be understood that three or more separate holding compartments may be similarly provided using any suitable segmented interior configuration.

Figure 3:
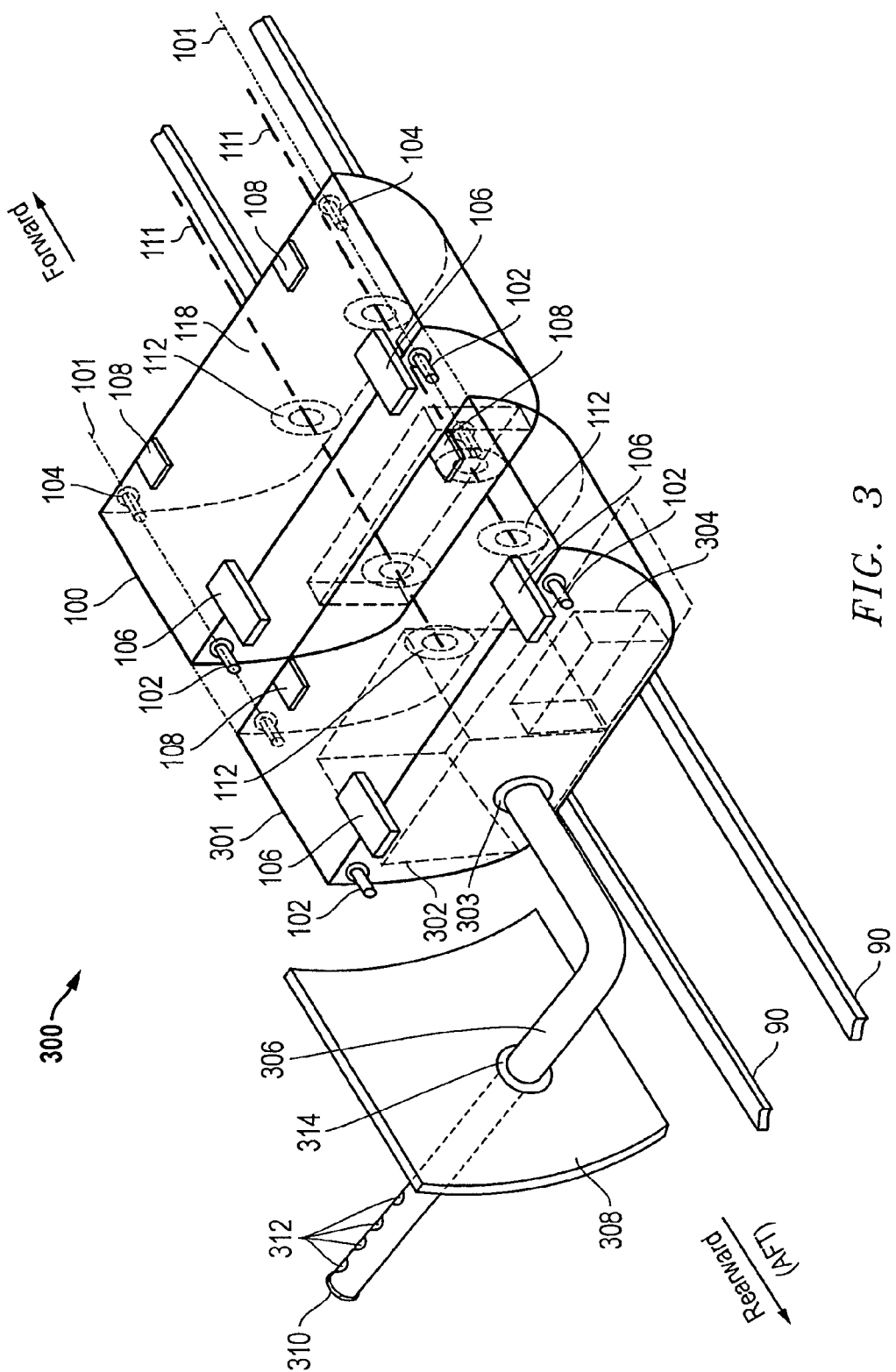
FIG. 3 is a simplified perspective view of modular pseudo cargo containers according to another embodiment of the disclosed systems and methods.

FIG. 3 illustrates one exemplary embodiment of an aerial dispersion system 300 that may include one or more aerial dispersant holding tanks 100 positioned in a front end-to-rear end relationship with a dispersal equipment container 301 that may be configured as a pseudo-cargo container and deployed within the baggage or cargo hold of an aircraft in a manner as previously described. As illustrated, dispersal equipment container 301 may be positioned within the baggage or cargo hold of the aircraft adjacent a cargo opening that may be, for example, the same cargo opening through which tanks 100 and container 301 are loaded and unloaded from the baggage or cargo hold.

Dispersal equipment container 301 is illustrated having an aerial dispersant outlet 303 coupled to an aerial spraying boom 310 through dispersant conduit 306 extending through opening 314 within a pseudo cargo door 308. In this regard pseudo cargo door 308 may be configured for temporary installation in place of a conventional cargo door of the aircraft during aerial dispersement operations. As shown, aerial spraying boom 310 includes spray outlets or nozzles 312 for aerially dispersing material supplied by dispersal equipment container 301, although it will be understood that the illustrated aerial spraying boom configuration is exemplary only and that any other type and/or configuration of airborne dispersal device suitable for spraying or otherwise aerially dispersing a particular material/s for a particular application may be employed.

As shown in FIG. 3, dispersal equipment container 301 may be internally configured with a dispersal regulator 302 coupled to at least one flow opening 112 of container 302. Dispersal regulator 302 may include, for example, one or more material transport devices and/or valves configured for transferring material from aerial dispersant holding tanks 100 under sufficient pressure to aerial spraying boom 310. In this regard, dispersal regulator 302 may be as simple as a valve for controlling gravity flow of aerial dispersant from tanks 100 (that may be pressurized or unpressurized) to boom 310, or may optionally include a material transport device such as a pump for pumping liquid aerial dispersant from tanks 100 to boom 310 at a desired pressure and/or flow rate. In either case, dispersal regulator 302 may be configured to selectively disperse material upon control signal or manual actuation, e.g., so that dispersant material contained in tanks 100 may be dispersed as two, three or more multiple loads during a single airborne sortie.

In one exemplary embodiment, dispersal regulator 302 may be configured for transferring dispersant material into tanks 100 during ground loading operations, e.g., through dispersant conduit 306. Alternatively, dispersal equipment container 301 may include a separate opening, conduit, and/or equipment (not shown) for this purpose. It will be understood that a dispersal equipment container may be configured in various ways as needed or desired for a particular aircraft or aerial dispersion mission. For example, a dispersal equipment container may be configured with multiple aerial dispersant outlets, e.g., for coupling to multiple aerial spray booms on one or both sides of an aircraft. It is also possible that a dispersal equipment container may be configured with flow openings on both front and rear ends to allow connection with dispersant holding tanks on both ends. In such a case, one or more aerial dispersant outlets may be provided on the sides or top of the dispersal equipment container, rather than the end.

As illustrated, dispersal equipment container 301 may also be configured with other auxiliary equipment 304 that may be include, for example, one or more devices selected or otherwise suitable for accomplishing the needs of the particular aerial dispersion task at hand. For example, auxiliary equipment 304 may include compression equipment (e.g., for providing pressurized gas to tanks 100), mixing equipment (e.g., for mixing two or more different materials taken from separate sources just prior to dispersal), foaming equipment (e.g., that is coupled to a compressor or other source of pressurized gas for foaming a material prior to dispersal), etc. Auxiliary equipment 304 may also include pumping and/or valving coupled to at least one flow opening 112 of container 301 for use during material loading operations. Dispersal unit 302 and/or auxiliary equipment 304 of container 301 may be controlled by a system operator and/or control subsystem, e.g., during aerial dispersement operations and/or ground loading operations.

It will be understood that dispersal equipment container 301 represents just one exemplary dispersal equipment configuration that may be implemented in aerial dispersion systems disclosed herein. In this regard, dispersal equipment may be provided in any configuration suitable for coupling to one or more material holding tanks and capable of performing one or more the dispersal equipment feature/s described above with relation to dispersal equipment container 301. Alternatively, one or more dispersal equipment components may be provided in a configuration integral to a material holding tank, e.g., coupling to other dispersal equipment components in a dispersal equipment container, or for direct coupling without dispersal equipment container to other components of an aerial dispersion system such as a dispersant conduit/aerial spraying boom.

Figure 4:
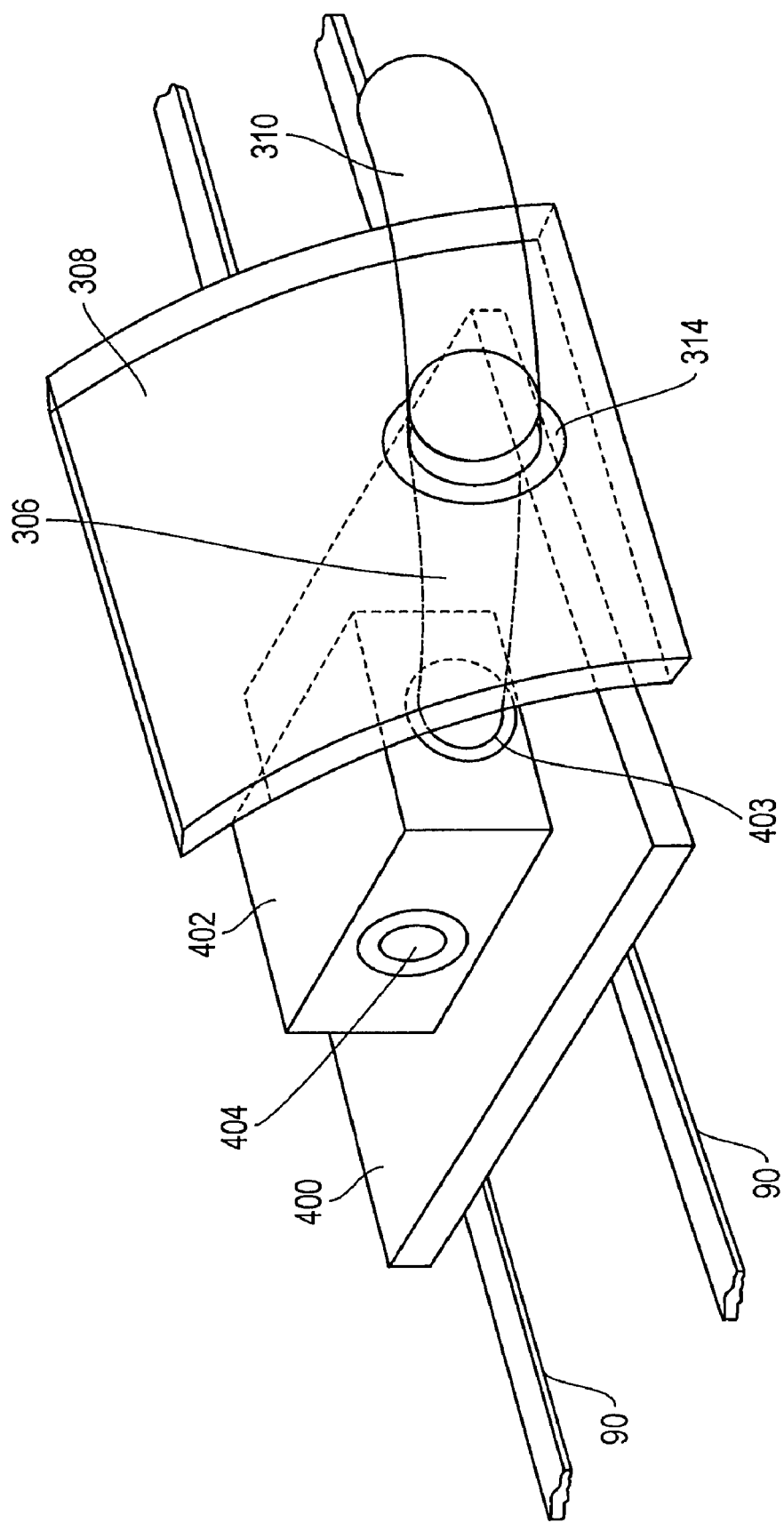
FIG. 4 is a simplified perspective view of a dispersal equipment pallet according to one embodiment of the disclosed systems and methods.

For example, FIG. 4 illustrates a dispersal equipment pallet 400 that may be alternatively implemented in an aerial dispersion system with the same features described above for dispersal equipment container 301. As illustrated, pallet 400 may include dispersal regulator 402 (e.g., valve/s and/or pump mechanism/s or other material transport device/s) that may be coupled to at least one flow opening of an aerial dispersant holding tank 100 via opening 403 that may serve for material transfer out of tanks 100 during aerial dispersant operations and optionally for material transfer into tanks 100 during ground loading operations. Dispersal regulator 402 is illustrated having an aerial dispersant outlet 404 coupled to an aerial spraying boom 310 through dispersant conduit 306 extending through opening 314 within a pseudo cargo door 308. As with dispersal regulator 302 of FIG. 3, dispersal regulator 402 may include, for example, one or more material transport devices and/or valves configured for transferring material from aerial dispersant holding tanks 100 under sufficient pressure to aerial spraying boom 310. Dispersal equipment pallet 400 may also include auxiliary equipment (not shown) similar to that described in relation to dispersal equipment container 301 of FIG. 3.

Figure 5:
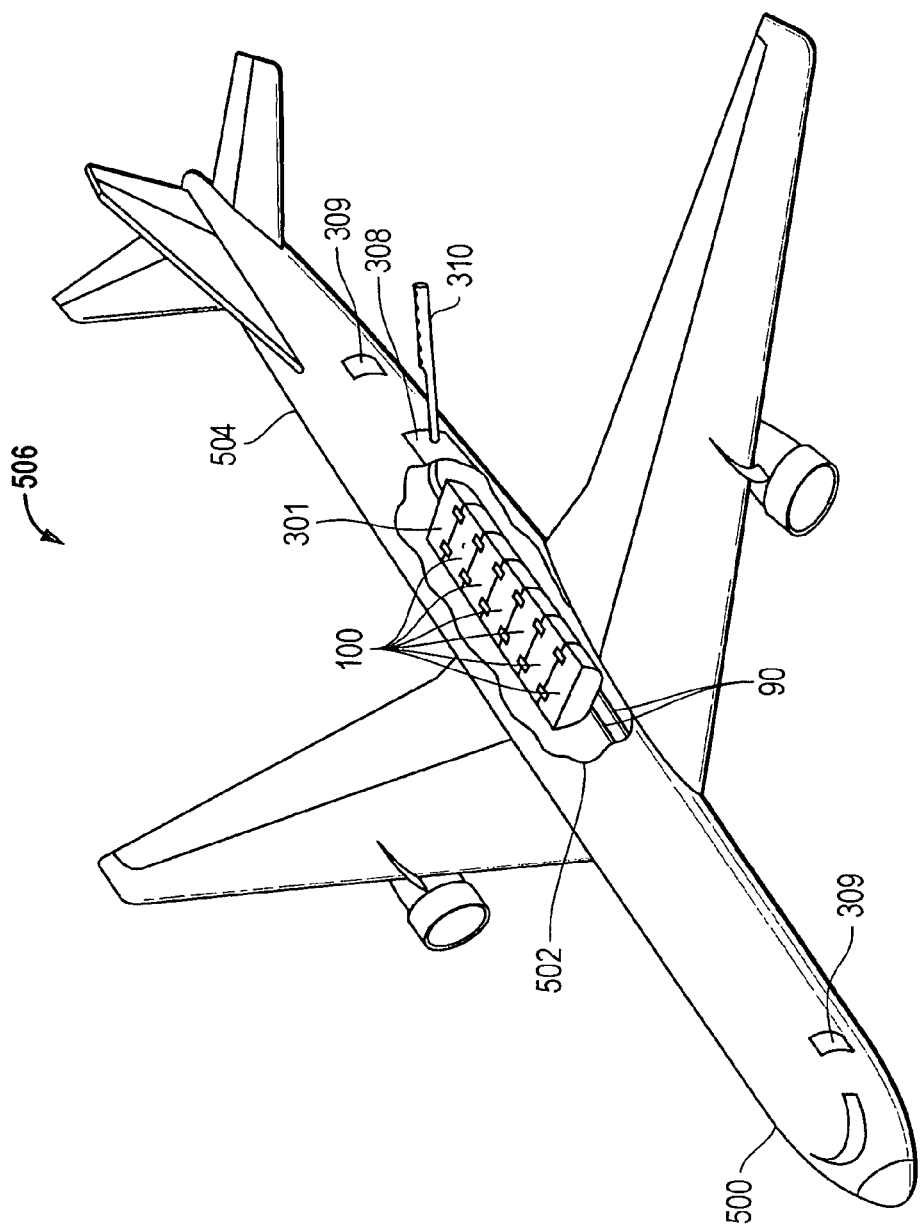
FIG. 5 is a simplified cut-out perspective view of components of an aerial dispersion system installed in an aircraft according to one embodiment of the disclosed systems and methods.

FIG. 5 illustrates an aircraft-based material dispersion system 506 having an aerial dispersion system installed within a host aircraft 500 according to one embodiment of the disclosed systems and methods. Host aircraft 500 may be any passenger, cargo or military aircraft having a baggage or cargo hold (or, as will be described further herein, having a passenger compartment) suitable for containing components of the disclosed system, for example, a wide-body aircraft such as 747, 767, 777, MD-11, C-5, C-141, etc. In FIG. 5, host aircraft 500 is shown with a section 502 cut out of fuselage 504 so that individual aerial dispersant holding tanks 100 are visible as loaded and operationally assembled together within the baggage or cargo hold of host aircraft 500 to form an aerial dispersion system, e.g., in a manner as previously described. Also shown is dispersal equipment container 301 that is positioned adjacent pseudo cargo door 308 and coupled to aerial spraying boom 310 which extends outwardly from door 308 for purposes of aerially dispersing materials contained in tanks 100. As previously described, pseudo cargo door 308 may be installed in place of a conventional cargo door within a pre-existing cargo opening in the fuselage of the aircraft, e.g., the same cargo opening through which holding tanks 100 and equipment container 301 may be loaded and unloaded from the aircraft. FIG. 5 also shows passenger doors 309 of host aircraft 500.

It will be understood that the illustrated embodiment of FIG. 5 is not drawn to scale, and is exemplary only. In this regard, it will be understood that the number and configuration of tanks may vary according to particular aircraft and mission. Furthermore, it will be understood that multiple pseudo cargo doors having multiple aerial spray booms may be positioned on one or both sides of an aircraft fuselage to maximize aerial spray pattern. This may be the case, for example, when employing aircraft having multiple cargo door openings on one or both sides of the aircraft fuselage.

Furthermore, it is possible that multiple but separate subgroups of holding tanks with associated dispersal equipment container or pallet may installed within an aircraft to form multiple independent aerial dispersion systems, e.g., for independently dispersing the same or different types of materials. Various other combinations are possible, for example, an equipment dispersal container may be positioned at the forward end of a group of interconnected tanks rather than at the aft end of the group of tanks, or equipment dispersal containers may be positioned at both forward and aft ends of a group of interconnected holding tanks for dispersing materials from each ends of the group of tanks through cargo doors positioned adjacent each dispersal container.

In one embodiment, a conventional commercial or military aircraft 500 may be temporarily converted for aerial dispersion operations as follows. On the ground, aerial dispersant holding tanks 100 and one or more dispersal equipment container/s 301 may be sequentially loaded into the baggage or cargo hold of aircraft 500 through one or more cargo openings in fuselage 504 using conventional cargo loading equipment and techniques. Conventional cargo door/s may also be replaced with pseudo cargo door/s at this time. Once loaded and interconnected within the baggage or cargo hold, aerial dispersion holding tanks 100 may be filled with one or more aerial dispersant materials as suitable or desired for a particular aerial dispersion mission.

Loading of aerial dispersion system equipment into an aircraft may or may not take place at the same time and at the same ground base as loading of material dispersant materials into the holding tanks. In this regard, it is possible that one or more aircraft may be flown to one or more designated central bases where aerial dispersion system equipment is kept and maintained, and where the components of the aerial dispersion system may be loaded into the aircraft to modify the aircraft for aerial dispersion purposes. The aircraft may then be flown to one or more designated local bases for loading of aerial dispersant material/s, e.g., at an area near or adjacent the aerial dispersant target, such as near a wildfire to be suppressed. After loading with dispersant material/s, the aircraft may fly one or more aerial dispersion sorties over the target area as necessary or desired, with reloading of aerial dispersant material taking place at the local bases as necessary. When the objective of the aerial dispersion mission is completed, the aircraft may be flown back to the central base/s for unloading of the aerial dispersion equipment from the baggage or cargo hold of the aircraft so as to de-modify the aircraft and return it to its conventional passenger or cargo configuration. The forgoing description is exemplary only, and it will be understood that the flexibility of the disclosed systems and methods make possible a variety of ways in which aircraft may be modified, employed, and de-modified for aerial dispersion purposes.

FIG. 6 is a simplified block diagram of an aerial dispersion system 600 according to one embodiment of the disclosed systems and methods. As shown, aerial dispersion system 600 includes multiple subsystems 602, 604, 606, 608, 610 and 612 that may be operably coupled together and interfaced with host aircraft systems 616 for aerial dispersion operations. Ground handling and support subsystem 614 may include ground equipment and personnel positioned at a central or local base and utilized for installing/uninstalling equipment components of an aerial dispersion system, and for loading/unloading material dispersant from an installed aerial dispersion system.

Still referring to FIG. 6, material containment subsystem 610 may include aerial dispersant material holding tanks and associated equipment previously described herein, and material dispersal subsystem 612 may include dispersal equipment container/pallet, pseudo cargo door, aerial spray boom and associated equipment previously described herein. As previously described, components of subsystems 610 and 612 may be monitored and/or controlled by a system operator and/or control subsystem, represented in FIG. 6 by control subsystem 604. Components of subsystems 602, 604, 606 and 608 may be provided in any suitable manner suitable for temporary installation in a host aircraft (e.g., palletized for loading in baggage/cargo hold or main cabin of host aircraft, or installed in a manner as described elsewhere herein), and may be operably coupled together and/or coupled to various systems of a host aircraft via hardware and/or wireless connection. It will be understood that the illustrated components of aerial dispersion system 600 are exemplary only, and that other combinations of subsystems are possible (e.g., using other subsystems and/or only a portion of the illustrated subsystems such as only subsystems 610 and 612).

Also illustrated in FIG. 6 is navigation subsystem 602 which may provide navigational information to control subsystem 604 that is based on navigation-related signals received from the ground, received from satellites, and/or received from the navigation systems of the host aircraft. In this regard, navigation subsystem 602 may provide flight characteristic information for the host aircraft (e.g., current aircraft location, altitude, attitude, speed, etc.), meteorological information at altitude for the host aircraft (e.g., winds, temperature, humidity, etc.), flight plan information (e.g., directions to material dispersant drop point, recovery point, local home base, etc.). In one exemplary embodiment, navigation subsystem 602 may be configured with a subsystem computer or processor to calculate various operational parameters (e.g., optimum material drop point, optimum flight plan, etc) based on flight characteristic information, meteorological information, etc.

Still referring to FIG. 6, communications subsystem 606 may provide communication information to control subsystem 604 from ground and/or other airborne sources to control subsystem 604 and vice-versa. In this regard, communications subsystem 606 may be coupled to existing antennae devices of the host aircraft and may receive a variety of information communicated from antennas of ground base controllers and/or other host aircraft including, but not limited to, voice or text communications from ground personnel or flight crews of other host aircraft, position and flight plan of other host aircraft, volume of material dispersant remaining in other host aircraft, position of ground personnel, meteorological information for the target area from ground personnel or ground weather sensors, up to date target location, information or orders concerning flight formation and coordinated aerial dispersant drops by multiple aircraft, etc. Communications subsystem 606 may also be employed to transmit information from control subsystem 604 to other host aircraft or ground stations. Such transmitted information may include, for example, any of the information received by control subsystem 604 from host aircraft systems 616 and/or from one or more subsystems 602, 606, 608, 610 and 612.

Sensor subsystem 608 may include any one or more sensor devices suitable for providing sensor information to control subsystem 604 that may be used to characterize a material dispersant target or conditions related to same. Examples of such sensor devices include, but are not limited to, real time visual information, electro-optic information, infra-red imaging, thermal imaging, radar imaging, radio receivers, etc. In one exemplary embodiment, one or more components of a sensor subsystem 608 may be provided as a movable turret or in another suitable configuration that may be temporarily installed on a host aircraft as part of pseudo wheel well door, in a manner similar to the pseudo cargo door described elsewhere herein. One specific example of such a sensor subsystem is a electro-optic/infra-red ("EO/IR") turret that may be incorporated into a pseudo wheel well door and utilized in a wildfire situation visualize the fire area and to identify fire hot-spots.

In one exemplary embodiment, control subsystem 604 of aerial dispersion system 600 may be implemented with command, control and display capabilities, although it is possible that any one or more of these capabilities may be implemented in other embodiments separately or in combination with other capabilities. To implement command, control and display capabilities, control subsystem 604 may be configured to receive and share information and control signals with each of subsystems 602, 606, 608, 610 and 612, as well as one or more host aircraft systems 616. Control subsystem 604 may also be provided with one or more computers or processors, and/or one or more display/s and control interface/s for use by a system operator/s on the host aircraft. In this regard, control subsystem 604 may receive and display information from each of the coupled subsystems to a system operator/s (e.g., position tracking information on other host aircraft in an aerial dispersant fleet, status of aerial dispersion systems including material dispersant volume on other host aircraft in an aerial dispersant fleet, sensor video data characterizing conditions in the aerial dispersant target area, meteorological and flight characteristics for the host aircraft or various ground locations, location of radio or optical beacons or ground markers deployed in the aerial dispersant target area for target designation, laser targeting point for a dispersant material drop zone, flight path and aircraft formation information for conducting an aerial dispersant material drop, material containment subsystem sensor, volume and operating parameters on the same host aircraft, material dispersal subsystem sensor, flow rate and operating parameters on the same host aircraft, etc.)

Control subsystem 604 may be employed, for example, to control flow control and monitoring subsystems of material containment subsystem 610 during dispersant material loading and aerial dispersement operations, e.g., to support material transfer between material containment subsystem 610 and material dispersal subsystem 612 for aerial dispersant drops, to respond to emergency conditions, and to maintain a stable host aircraft center of gravity by preventing shifts in the dispersant material. Control subsystem 604 may also be employed to control material dispersal subsystem 612 during aerial dispersant drops, e.g., to control type of material dispersed, material dispersal rate, mixing of dispersant materials, etc. Other control features that may be implemented by control subsystem 604 include control of sensor subsystem 608 to gather desired sensor information, control of communications subsystem 606 to transmit data or command information to ground or other host aircraft, control of host aircraft systems 616 including control of aircraft flight characteristics during aerial dispersant "bombing" run, etc.

It will be understood that the forgoing description of control subsystem 604 is exemplary only, and that other combinations of control, display and command features may be employed as may be desired or necessary for a given application. Furthermore, it will be understood that the control and command features may be completely manual (e.g., via system operator/s), or may be partially or completely automated (e.g., via computer or other processor/s). It is also possible that at least a portion of the control and/or command features for an aerial dispersion systems on a given host aircraft may be performed by equipment or personnel on another aircraft or the ground.

Although not shown, in an alternate and optional embodiment the passenger compartment of a host aircraft may be alternately or additionally employed to contain one or more modular components of an aerial dispersion system such as disclosed elsewhere herein (e.g., pseudo cargo container/s, dispersal regulator, etc). In this regard, the passenger seats or other equipment contained within the passenger compartment of a given aircraft may be partially or completely removed, and replaced with components of an aerial dispersion system that are configured with a shape complementary to the interior dimensions and shape of the passenger compartment, and/or that are otherwise configured with dimensions suitable to allow the aerial dispersion system components to be operably installed, secured and contained therein. In this regard, system components may be configured as pseudo cargo containers or in any other alternative shape or dimension suitable for installation in a passenger compartment. In one exemplary embodiment, one or more system components may be configured as pseudo-cargo containers having outer dimensions that correspond to dimensions of conventional cargo containers adapted for installation and removal from an aircraft passenger compartment, for example, as described and illustrated in U.S. Pat. No. 5,090,639, which is incorporated herein by reference.

For example, in one exemplary embodiment, aerial dispersion system components may be installed within all or a portion of the passenger compartment as an alternative to installation of aerial dispersion system components within the baggage or cargo hold of the aircraft. This may be done, for example, by providing one or more pseudo passenger door/s or pseudo emergency exit door/s that are configured with features similar to a pseudo cargo door described elsewhere herein, e.g., configured with an opening through which a dispersant conduit may extend to couple components of the passenger compartment-based aerial dispersion system to an aerial spraying boom or other dispersal mechanism outside the aircraft. In such an exemplary embodiment, the aerial dispersion system components may be configured to operate in a manner similar to the baggage or cargo hold-based aerial dispersion system components described elsewhere herein.

In another exemplary embodiment, aerial dispersion system components may be installed within all or a portion of the passenger compartment in addition to other aerial dispersion system components that are installed within all or a portion of the baggage or cargo hold of the same aircraft. In such a dual-compartment installation (i.e., when components are installed in both cargo and passenger compartments), the aerial dispersion system components in the passenger compartment may be implemented as a separate aerial dispersion system that operates or functions independently of the aerial dispersion system components installed within the baggage or cargo hold of the same aircraft (e.g., as a separate and independent system as described in the immediately preceding paragraph). Alternatively, the aerial dispersion system components installed in the passenger compartment may be implemented in combination or conjunction with aerial dispersion system components that are installed within the baggage or cargo hold of the same aircraft (e.g., to operate as one aerial dispersion system formed by components in positioned in both baggage/cargo hold and cabin/passenger compartments of the same aircraft). In the latter case, the baggage/cargo hold-based components may be configured to be in fluid and/or electrical signal communication with the cabin/passenger compartment-based components of the system in any suitable manner, e.g., through custom-made openings specifically made for that purpose and/or through existing conduits or openings disposed between the baggage/cargo hold and cabin/passenger compartment (e.g., existing plumbing conduits or openings, electrical conduits or openings, access doors, etc.).

In the practice of the disclosed systems and methods, one or more aerial dispersion systems may be employed on one or more host aircraft for aerial dispersement of any material that is suitable for aerial dispersement, including any of the aerial dispersement materials and in any of the aerial dispersement tasks described elsewhere herein. In this regard, it is possible that only a single host aircraft may be modified with the disclosed aerial dispersion system and employed for aerial dispersion of materials. Although any type of aircraft having a baggage or cargo hold suitable for use with components of the disclosed systems may be employed, particular advantage may be realized by using high lift capacity aircraft (e.g., aircraft having a gross carrying capacity of greater than or equal to about 100,000 pounds). For example, a typical 747 commercial aircraft has a gross carrying weight of about 140,000 pounds and is capable of carrying about 13,000 gallons of liquid dispersant material such as water. This is over four times the 3000 gallons carrying capacity of a typical aerial dispersant system aircraft now employed for purposes such as aerial firefighting. Thus, using the disclosed systems and methods to convert even a single high lift capacity aircraft for aerial dispersion tasks achieves a significant increase in material dispersant volume capacity.

However, in one exemplary embodiment a plurality of relatively high capacity aerial dispersion systems may be provided by installing these systems on a relatively large fleet of wide-body or other high lift capacity host aircraft. Such a fleet of host aircraft may be advantageously employed, for example, to protect high value targets (e.g., populated areas, industrial areas, environmentally sensitive areas, wilderness areas, etc.) from threats such as large scale fires, large scale oil or chemical spills, biological hazards, radiation hazards, etc. In such an embodiment, a relatively large number of commercial and/or military aircraft may be activated for temporary and short term use, for example, as part of the Civil Reserve Air Fleet ("CRAF"). Using the systems and methods disclosed herein, the activated aircraft may be modified in a relatively short period of time (e.g., in less than about 8 hours) at one or more locations for an aerial dispersion role such as firefighting, oil spill containment/treatment, or neutralization of biological, chemical or radiation hazard. The aircraft may be loaded with material dispersant at one or more locations and then assembled as an airborne fleet for purpose of conducting a massive and coordinated multi-aircraft drop of aerial dispersant over the target area/s, with little or no support required from ground personnel such as fire jumpers or spotters. Upon completion of the aerial dispersion mission the aircraft may be demodified in a relatively short period of time (e.g., in less than about 8 hours) at one or more locations and returned to prior commercial or military use.

Therefore, the disclosed systems and methods allow a large fleet of high lift capacity aircraft to be rapidly assembled and modified for aerial dispersion purposes. Such a fleet of modified high capacity aircraft may be coordinated and/or controlled in any manner suitable for optimally achieving the goals of the aerial dispersion task with minimal risk to the flight crews and aircraft. For example, multiple aircraft (e.g., 12 to 15 747 aircraft) may be flown in a coordinated side-by-side or row formation over the targeted drop area, maximizing the aerial coverage of dispersant that may be provided to the drop area in a single pass. Alternatively or additionally, coordinated successive or sequential rows of one or more aircraft may immediately follow each other in trailing formation in the same pass over the targeted drop area to greatly increase the volume of dispersant material that may be applied to the target area in a short period of time. Aerial dispersion operations (e.g., fleet formation, flight path and drop point for the material dispersant drop, etc.) conducted by a fleet of modified aircraft may be controlled, for example, by centralized ground or air control system or personnel using, for example, the aerial dispersion system components illustrated and described with respect to FIG. 6 herein. The very large volume and continuous coverage area of dispersant material that may be so applied using such a fleet of high capacity aircraft, advantageously allows the material to be dispersed at a relatively high altitude (e.g., greater than or equal to about 500 feet) and with a relatively stable and level flight attitude that does not overstress the aircraft structures.

Although the disclosed systems and methods may be used to disperse materials over target drop zones at relatively high altitudes and stable and level flight attitude, it may be desirable to adjust the nose to tail attitude of the aircraft during material drop to optimize gravity forces for fluid flow between material dispersant holding tanks and the aerial spray boom or other aerial dispersing device. This may be more desirable, for example, in the practice of those embodiments that employ gravity fluid flow.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. A method of temporarily converting at least one fixed wing wide body host aircraft for aerial dispersion purposes comprising:
   providing a fixed wing wide body host aircraft;
   operating said fixed wing wide body host aircraft in conventional passenger or conventional cargo configuration for commercial passenger or commercial cargo use;
   then converting said fixed wing wide body host aircraft for aerial dispersion operations by providing and installing one or more aerial dispersant holding tanks within said fixed wing wide body host aircraft;
   then aerially dispersing one or more materials from said one or more aerial dispersant holding tanks installed within said fixed wing wide body host aircraft;
   then returning said fixed wing wide body host aircraft to said conventional passenger or conventional cargo configuration by removing said one or more aerial dispersant holding tanks from said fixed wing wide body host aircraft; and
   then operating said fixed wing wide body host aircraft for commercial passenger or commercial cargo use.

2. The method of claim 1, wherein said method comprises:
   operating said fixed wing wide body host aircraft in conventional passenger configuration for commercial passenger use prior to said step of converting said fixed wing wide body host aircraft for aerial dispersion operations;
   returning said fixed wing wide body host aircraft to said conventional passenger configuration after said step of aerially dispersing one or more materials; and
   then operating said fixed wing wide body host aircraft for commercial passenger use.

3. The method of claim 1, wherein said fixed wing wide body host aircraft has a gross carrying capacity of greater than or equal to about 100,000 pounds.

4. The method of claim 3, wherein said fixed wing wide body host aircraft comprises a wide body passenger plane.

5. The method of claim 1, wherein said one or more aerial dispersant holding tanks comprise a material containment subsystem; wherein said dispersal regulator comprises a material dispersal subsystem; and wherein said method further comprises providing and coupling a control subsystem to said material containment subsystem and said material dispersal subsystem.

6. The method of claim 5, wherein said method further comprises providing and coupling a navigation subsystem, a communications subsystem, and a sensor subsystem to said control subsystem; and coupling said control subsystem, said navigation subsystem and said communications subsystem to one or more host aircraft systems.

7. The method of claim 1, wherein said method comprises aerially dispersing said one or more materials from said one or more aerial dispersant holding tanks installed within said fixed wing wide body host aircraft to suppress a fire after converting said fixed wing wide body host aircraft for aerial dispersion operations and prior to returning said fixed wing wide body host aircraft to said conventional passenger or conventional cargo configuration.

8. The method of claim 1, wherein said method comprises:
providing two or more fixed wing wide body host aircraft;
operating said two or more fixed wing wide body host aircraft in conventional passenger or conventional cargo configuration for commercial passenger or commercial cargo use;
then converting said two or more fixed wing wide body host aircraft to a fleet of two or more fixed wing wide body host aircraft configured for aerial dispersion operations by providing and installing one or more aerial dispersant holding tanks within each of said two or more said fixed wing wide body host aircraft;
then aerially dispersing one or more materials from said one or more aerial dispersant holding tanks installed within each of said fleet of two or more fixed wing wide body host aircraft;
then returning said two or more fixed wing wide body host aircraft to said conventional passenger or conventional cargo configuration by removing said one or more aerial dispersant holding tanks from each of said fixed wing wide body host aircraft; and
then operating said two or more fixed wing wide body host aircraft for commercial passenger or commercial cargo use.

9. The method of claim 8, wherein said method comprises aerially dispersing said one or more materials from said one or more aerial dispersant holding tanks installed within each of said fleet of two or more fixed wing wide body host aircraft to suppress a fire prior to removing said one or more aerial dispersant holding tanks from within each of said two or more fixed wing wide body host aircraft.

10. The method of claim 1, wherein said method comprises:
providing two or more fixed wing wide body host aircraft;
operating said two or more fixed wing wide body host aircraft in conventional passenger configuration for commercial passenger use;
then converting said two or more fixed wing wide body host aircraft to a fleet of two or more fixed wing wide body host aircraft configured for aerial dispersion operations by providing and installing one or more aerial dispersant holding tanks within each of said two or more said fixed wing wide body host aircraft;
then aerially dispersing one or more materials from said one or more aerial dispersant holding tanks installed within each of said fleet of two or more fixed wing wide body host aircraft;
then returning said two or more fixed wing wide body host aircraft to said conventional passenger configuration by removing said one or more aerial dispersant holding tanks from each of said fixed wing wide body host aircraft; and
then operating said two or more fixed wing wide body host aircraft for commercial passenger use.

11. A method of temporarily converting two or more fixed wing host aircraft for aerial dispersion purposes, comprising:
providing two or more fixed wing host aircraft;
providing and loading one or more aerial dispersant holding tanks into each of said two or more fixed wing host aircraft;
providing a control subsystem for each of said two or more fixed wing host aircraft, each of said control subsystems being configured to control at least one of material dispersement or flight characteristics of one of said two or more fixed wing host aircraft;
controlling aerial dispersion operations of said two or more fixed wing host aircraft as a fleet using control signals communicated from at least one of a common ground source or a common airborne source to said control subsystem to provide common control to direct a flight path of each of said two or more fixed wing host aircraft, or to control release of one or more materials from each of said two or more fixed wing host aircraft to aerially disperse said one or more materials from said fleet of two or more fixed wing host aircraft in a coordinated manner, or a combination thereof; and
then removing said one or more modular aerial dispersant holding tanks from each of said two or more fixed wing host aircraft.

12. The method of claim 11, wherein said method comprises controlling aerial dispersion operations of said two or more fixed wing host aircraft as a fleet using control signals communicated from at least one of said common ground source or said common airborne source to said control subsystem to control release of one or more materials from each of said two or more fixed wing host aircraft to aerially disperse said one or more materials from said fleet of two or more fixed wing host aircraft in a coordinated manner.

13. The method of claim 11 wherein said method comprises controlling aerial dispersion operations of said two or more fixed wing host aircraft as a fleet using control signals communicated from at least one of said common ground source or said common airborne source to said control subsystem of each of said two or more fixed wing host aircraft to provide common control to direct a flight path of each of said two or more fixed wing host aircraft by using said control subsystem of each of said two or more fixed wing host aircraft to control aircraft flight characteristics of each of said respective two or more fixed wing host aircraft.

14. The method of claim 13, wherein said control subsystems of each of said two or more fixed wing host aircraft comprises one or more processors; and wherein said method further comprises using said one or more processors of said control subsystem of each respective one of said two or more fixed wing host aircraft to direct said flight path of said respective one of said two or more fixed wing host aircraft in a completely automated manner based on said control signals communicated from at least one of said common ground source or said common airborne source.

15. The method of claim 14, said method further comprising:
   operating said two or more fixed wing host aircraft in a formation with a first one of said two or more fixed wing host aircraft being a lead aircraft of said formation; and
   controlling aerial dispersion operations of said two or more fixed wing host aircraft as a fleet using control signals communicated from a control subsystem of said lead aircraft of said formation to a control subsystem of a second one of said two or more fixed wing host aircraft to direct a flight path of said second one of said two or more fixed wing host aircraft by using said control subsystem of said second one of said two or more fixed wing host aircraft to control aircraft flight characteristics of said second one of said two or more fixed wing host aircraft.

16. The method of claim 15, said method further comprising:

providing one or more sensor devices for at least one of said two or more fixed wing host aircraft;

providing sensor information from said one or more sensor devices to said control subsystem of said lead aircraft of said formation, said sensor information characterizing a material dispersant target or conditions related to said material dispersant target; and controlling aerial dispersion operations of said two or more fixed wing host aircraft as a fleet based at least partially on said sensor information provided from said one Or more sensor devices using control signals communicated from said control subsystem of said lead aircraft of said formation to said control subsystem of said second one of said two or more fixed wing host aircraft to direct said flight path of said second one of said two or more fixed wing host aircraft by using said control subsystem of said second one of said two or more fixed wing host aircraft to control aircraft flight characteristics of said second one of said two or more fixed wing host aircraft.

17. The method of claim 16, further comprising using said one or more sensor devices to identify a fire hot-spot; and providing said identified fire hot spot as sensor information to said control subsystem of said lead aircraft of said formation to direct said flight path of said second one of said two or more fixed wing host aircraft.

18. The method of claim 16, wherein each said control subsystem comprises one or more processors; and wherein said method further comprises using said one or more processors of said control subsystem of each of said two or more fixed wing host aircraft for said control of said aircraft flight characteristics of said second one of said two or more fixed wing host aircraft.

19. The method of claim 15, said method further comprising:

providing a navigation subsystem for at least one of said two or more fixed wing host aircraft, said navigation subsystem being configured to provide meteorological information at altitude for said at least one of said two or more fixed wing host aircraft;

using said navigation subsystem to calculate at least one of material drop point or flight plan or a combination thereof based on said meteorological information;

providing at least one of said material drop point or said flight plan or said combination thereof to said control subsystem of said lead aircraft of said formation; and controlling aerial dispersion operations of said two or more fixed wing host aircraft as a fleet based at least partially on said material drop point or said flight plan or said combination thereof using control signals communicated from said control subsystem of said lead aircraft of said formation to said control subsystem of said second one of said two or more fixed wing host aircraft to direct said flight path of said second one of said two or more fixed wing host aircraft by using said control subsystem of said second one of said two or more fixed wing host aircraft to control aircraft flight characteristics of said second one of said two or more fixed wing host aircraft.

20. The method of claim 19, wherein each said navigation subsystem and each said control subsystem comprises one or more processors; and wherein said method further comprises using said one or more processors of said control subsystem of each of said two or more fixed wing host aircraft for said control of said aircraft flight characteristics of said second one of said two or more fixed wing host aircraft.

21. The method of claim 11, wherein said method comprises controlling aerial dispersion operations of said two or more fixed wing host aircraft as a fleet using control signals communicated from a common airborne source to said control subsystem of each of said two or more fixed wing host aircraft' to provide common control to direct a flight path of each of said two or more fixed wing host aircraft by using said control subsystem of each of said two or more fixed wing host aircraft to control aircraft flight characteristics of each of said respective two or more fixed wing host aircraft.

22. The method of claim 21, wherein said control subsystems of each of said two or more fixed wing host aircraft comprises one or more processors; and wherein said method further comprises using said one or more processors of said control subsystem of each respective one of said two or more fixed wing host aircraft to direct said flight path of said respective one of said two or more fixed wing host aircraft in a completely automated manner based on said control signals communicated from said common airborne source.

23. The method of claim 11, wherein said method comprises controlling aerial dispersion operations of said two or more fixed wing host aircraft as a fleet using control signals communicated from a common ground source to said control subsystem of each of said two or more fixed wing host aircraft to provide common control to direct a flight path of each of said two or more fixed wing host aircraft by using said control subsystem of each of said two or more fixed wing host aircraft to control aircraft flight characteristics of each of said respective two or more fixed wing host aircraft.

24. The method of claim 23, wherein said control subsystems of each of said two or more fixed wing host aircraft comprises one or more processors; and wherein said method further comprises using said one or more processors of said control subsystem of each respective one of said two or more fixed wing host aircraft to direct said flight path of said respective one of said two or more fixed wing host aircraft in a completely automated manner based on said control signals communicated from said common ground source.

25. The method of claim 24, wherein said common ground source comprises ground personnel.

26. A method of temporarily converting at least one fixed wing host aircraft for aerial dispersion purposes comprising:

providing a fixed wing host aircraft;

providing and loading one or more aerial dispersant holding tanks into said fixed wing host aircraft;

controlling aerial dispersion operations of said fixed wing host aircraft using control signals communicated from at least one of a ground source or another airborne source to direct a flight path of said fixed wing host aircraft, or to control release of one or more materials from said fixed wing host aircraft to aerially disperse said one or more materials from said fixed wing host aircraft, or a combination thereof; and then removing said one or more modular aerial dispersant holding tanks from said fixed wing host aircraft.

27. The method of claim 26, wherein said method comprises controlling aerial dispersion operations of said at least one fixed wing host aircraft using control signals communicated from at least one of said ground source or said another airborne source to control release of one or more materials from said at least one fixed wing host aircraft to aerially disperse said one or more materials from said at least one fixed wing host aircraft.

28. The method of claim 26, wherein said method comprises controlling aerial dispersion operations of said at least one fixed wing host aircraft using control signals communicated from at least one of said ground source or said another airborne source to direct a flight path of said at least one fixed wing host aircraft by controlling aircraft flight characteristics of said at least one fixed wing host aircraft.

29. The method of claim 26, wherein said method comprises controlling aerial dispersion operations of said at least one fixed wing host aircraft using control signals communicated from said ground source to direct a flight path of said at least one fixed wing host aircraft by controlling aircraft flight characteristics of said at least one fixed wing host aircraft.

30. The method of claim 26, wherein said method comprises controlling aerial dispersion operations of said at least one fixed wing host aircraft using control signals communicated from said at least one another airborne source to direct a flight path of said at least one fixed wing host aircraft by controlling aircraft flight characteristics of said at least one fixed wing host aircraft.

31. The method of claim 30, said method further comprising:
  providing one or more sensor devices for said at least one another airborne source;
  providing sensor information from said one or more sensor devices, said sensor information characterizing a material dispersant target or conditions related to said material dispersant target; and
  controlling aerial dispersion operations of said at least one fixed wing host aircraft based at least partially on said sensor information provided from said one or more sensor devices using control signals communicated from said at least one another airborne source to direct a flight path of said at least one fixed wing host aircraft by controlling aircraft flight characteristics of said at least one fixed wing host aircraft.

32. The method of claim 31, further comprising using said one or more sensor devices to identify a fire hot-spot; and providing said identified fire hot spot as sensor information to direct said flight path of said at least one fixed wing host aircraft.

33. The method of claim 30, said method further comprising:
  providing a navigation subsystem for said at least one another airborne source, said navigation subsystem being configured to provide meteorological information at altitude for said at least one another airborne source;
  using said navigation subsystem to calculate at least one of material drop point or flight plan or a combination thereof based on said meteorological information;
  controlling aerial dispersion operations of said at least one fixed wing host aircraft based at least partially on said material drop point or said flight plan or said combination thereof using control signals communicated from said at least one another airborne source to direct a flight path of said at least one fixed wing host aircraft by controlling aircraft flight characteristics of said at least one fixed wing host aircraft.

34. A method of temporarily converting at least one fixed wing host aircraft for aerial dispersion of material, comprising:
  providing a fixed wing host aircraft having at least one of a side cargo opening and a baggage or cargo hold, a passenger door opening and a passenger compartment, or a combination thereof;
  providing at least one aerial dispersant holding tank;
  then disposing said at least one aerial dispersant holding tank within said at least one fixed wing host aircraft by at least one of loading said at least one aerial dispersant holding tank through said side cargo opening of said fixed wing host aircraft into said baggage or cargo hold of said fixed wing host aircraft, loading said at least one aerial dispersant holding tank through said passenger door opening of said fixed wing host aircraft into said passenger compartment of said fixed wing host aircraft, or a combination thereof;
  then aerially dispersing one or more materials from said one or more aerial dispersant holding tanks installed within said fixed wing host aircraft; and
  then removing said at least one aerial dispersant holding tank from said at least one fixed wing host aircraft by at least one of unloading said at least one aerial dispersant holding tank through said side cargo opening of said fixed wing host aircraft from said baggage or cargo hold of said fixed wing host aircraft, unloading said at least one aerial dispersant holding tank through said passenger door opening of said fixed wing host aircraft from said passenger compartment of said fixed wing host aircraft, or a combination thereof.

35. An aircraft-based material dispersion system, comprising:
  a fixed wing host aircraft having at least one of a side cargo opening and a baggage or cargo hold, a passenger door opening and a passenger compartment, or a combination thereof;
  at least one aerial dispersant holding tank disposed within said fixed wing host aircraft; and
  an airborne dispersal device disposed on said host aircraft and coupled to said at least one aerial dispersant holding tank, the airborne dispersal device being coupled for aerially dispersing one or more materials from said at least one aerial dispersant holding tank in normal use;
  wherein said at least one aerial dispersant holding tank is removably disposed within said baggage or cargo hold of said fixed wing host aircraft and is configured to be compatible with a side-loading aircraft cargo system of said fixed wing host aircraft for installation and removal from said baggage or cargo hold through said side cargo opening of said fixed wing host aircraft, or wherein said at least one aerial dispersant holding tank is removably disposed within said passenger compartment of said fixed wing host aircraft and is configured for installation and removal from said passenger compartment of said fixed wing host aircraft through said passenger door opening of said fixed wing host aircraft.

* * * * *